United States Patent [19]

Fuhr et al.

[11] Patent Number: 5,741,838
[45] Date of Patent: Apr. 21, 1998

[54] FLAME RETARDENT THERMOPLASTIC POLYCARBONATE MOULDING COMPOUNDS

[75] Inventors: Karl Fuhr, Krefeld; Thomas Eckel, Dormagen; Dieter Wittmann, Leverkusen; Heinrich Alberts, Odenthal, all of Germany

[73] Assignee: Bayer AG, Leverkusen, Germany

[21] Appl. No.: 513,052

[22] Filed: Aug. 9, 1995

[30] Foreign Application Priority Data

Aug. 18, 1994 [DE] Germany ............... 44 29 319.4

[51] Int. Cl.[6] ............... C08J 5/10; C08K 5/52; C08L 69/00
[52] U.S. Cl. ............... 524/127; 524/128; 524/141; 524/537; 524/540
[58] Field of Search ............... 524/127, 141, 524/128, 537, 540, 140, 504

[56] References Cited

U.S. PATENT DOCUMENTS 5,001,745  3/1991  Pollock ............... 379/96
5,030,675  7/1991  Wittmann et al. ............... 524/130
5,204,394  4/1993  Gosens et al. ............... 524/125

FOREIGN PATENT DOCUMENTS

| 01 33 641 | 3/1985 | European Pat. Off. . |
| 0 522 653 | 1/1993 | European Pat. Off. . |
| 05 22 397 | 1/1993 | European Pat. Off. . |
| 05 22 653 | 1/1993 | European Pat. Off. . |
| 0521628A2 | 1/1993 | European Pat. Off. . |
| 42 00 247 | 7/1993 | Germany . |

OTHER PUBLICATIONS

Derwent JP 06 057 159 (Mar. 1, 1994).
Pat. Abstr. Jap. JP 07 026 129 (Jan. 27, 1995).

Primary Examiner—Vasu Jagannathan
Assistant Examiner—U. K. Rajguru
Attorney, Agent, or Firm—Connolly and Hutz

[57] ABSTRACT

This invention relates to halogen-free flame retardant thermoplastic moulding compounds prepared from polycarbonate and graft polymer, which may contain thermoplastic copolymer and/or polyalkylene terephthalate, wherein the flame retardant used is polyphenylene oxide combined with phosphorus compounds.

6 Claims, No Drawings

FLAME RETARDENT THERMOPLASTIC POLYCARBONATE MOULDING COMPOUNDS

This invention relates to halogen-free flame retardant thermoplastic moulding compounds prepared from polycarbonate and graft polymer, which may optionally contain thermoplastic copolymer and/or polyalkylene terephthalate, wherein the flame retardant used is polyphenylene oxide combined with phosphorus compounds.

U.S. Pat. Nos. 5,001,745 and 5,030,675 describe flame resistant thermoplastic moulding compounds prepared from aromatic polycarbonate, ABS polymer, copolymer or polyalkylene terephthalate together with monophosphate and fluorinated polyolefins as flame retardant and anti-dripping agent respectively. One disadvantage of the fluorinated polyolefins which may be cited is their halogen content and the hydrogen fluoride arising therefrom in the event of fire. However, the use of special polytetrafluoroethylene has hitherto been the only way of producing self-extinguishing moulding compounds from aromatic polycarbonates, optionally thermoplastic copolymers and thermoplastic polyalkylene terephthalates and graft polymers with the rating V-O with 1.6 mm thick test specimens to UL-94.

EP-0 363 608 describes polymer blends made from aromatic polycarbonate, copolymers and graft polymers together with oligomeric phosphates based on, for example, hydroquinone and resorcinol as flame retardant additives. Polyphenylene ethers are not mentioned. Effective flame retardancy of V-0/1.6 mm to UL-94 is achieved only in the presence of polytetrafluoroethylene.

Thermoplastic moulding compounds prepared inter alia from aromatic polycarbonates, polyphenylene ethers, graft polymers, styrene copolymers together with 0 to 20 wt. % of organic phosphates and 0 to 2 wt. % of tetrafluoroethylene polymers are known from DE-OS 4 200 247. The object of the invention was to provide thermoplastic polycarbonate moulding compounds having an overall good range of properties, in particular with elevated heat resistance. This is demonstrated in examples 1 and 2 in relation to comparative examples. It may be seen from example 2 that flame retardancy of V-0 to UL-94 is achieved with the components polyphenylene oxide, triphenyl phosphate and polytetrafluoroethylene. The use of polyphenylene ethers with only phosphates without also using polytetrafluoro-ethylene to achieve flame retardancy of V-0/1.6 mm to UL-94 is not described.

EP-A-522 653 describes ABS graft rubbers with polyphenylene ethers or novolaks and inter alia bisphosphates as flame retardants. Typical copolymers or polycarbonate may also be used. The flame retardancy of the particular blend is stated in the form of the oxygen index (LOI value to ASTM). In example 3, table 3 with ABS and polycarbonate (40 wt. % each), 10 wt. % each of polyphenylene ether and hydroquinone bis-(diphenyl phosphate) are used to impart flame retardancy, the LOI value is 23.5 (a relatively low value, with no description of the dripping behaviour). It could not be assumed from a knowledge of EP-A 522 653 that, by replacing the hydroquinone with resorcinol bis-(diphenyl phosphate) and also using readily flammable typical copolymers, a non-dripping V-0/1.6 mm may be achieved, i.e. distinctly higher flame retardancy without dripping (halogen-free, without using polytetrafluoroethylene).

It has been discovered that by using 2 to 8 wt. % of polyphenylene oxide combined with 3 to 18 wt.% of phosphorus compound according to component E) described below, self-extinguishing without dripping in accordance with the UL-94 test with a rating of V-0 in 1.6 mm thick test specimens is achieved in moulding compounds prepared from thermoplastic aromatic polycarbonates, optionally thermoplastic copolymers and thermoplastic polyalkylene terephthalates, together with graft polymers. The polytetrafluoroethylene hitherto used as anti-dripping agent is not required. The moulding compounds according to the invention thus constitute moulding compounds which are completely halogen-free and have highly effective non-dripping and self-extinguishing properties in the event of fire. Use of component E.2) described below also provides distinctly improved stress cracking resistance. The moulding compounds exhibit a good range of properties with regard to impact and notched impact strength, heat resistance, surface quality and migration on storage.

The present invention provides halogen-free, flame retardant thermoplastic moulding compounds which do not produce burning drips in the event of fire, consisting of A) 50 to 95 wt. %, preferably 60 to 90 wt. %, of thermoplastic aromatic polycarbonate, B) 0 to 20 wt. %, preferably 1 to 15 wt. %, of copolymer or polycondensation product prepared from B.1) thermoplastic copolymer prepared from B.1.1) 50 to 95 wt. % of styrene, α-methylstyrene, ring-alkylated styrene, $C_1$–$C_8$ alkyl acrylate, $C_1$–$C_8$ alkyl methacrylate or mixtures thereof and B.1.2) 5 to 50 wt. % of acrylonitrile, methacrylonitrile, $C_1$–$C_8$ alkyl acrylate, $C_1$–$C_8$ alkyl methacrylate, maleic anhydride, N-substituted maleimide, vinyl acetate or mixtures thereof and/or B.2) thermoplastic polyalkylene terephthalate, C) 3 to 18 wt. % preferably 5 to 15 wt. %, of graft polymer produced from C.1) 5 to 90 wt. % preferably 30 to 80 wt % of a mixture prepared from C.1.1) 50 to 95 wt. % of styrene, α-methylstyrene, ring-alkylated styrene, methyl methacrylate or mixtures thereof and C.1.2) 5 to 50 wt. % of acrylonitrile, methacrylonitrile, $C_1$–$C_8$ alkyl acrylate, $C_1$–$C_8$ alkyl methacrylate, maleic anhydride, N-substituted maleimide or mixtures thereof on C.2) 10 to 95 wt. %, preferably 20 to 70 wt %, of rubber with a glass transition temperature $T_g$ of $\leq 10°$ C., D) 2 to 8 wt. %, preferably 3 to 6 wt. %, of thermoplastic polyphenylene ether, E) 3 to 18 wt. % preferably 5 to 15 wt. % of phosphoric acid ester prepared from E.1) phosphorus compounds of the formula (I),

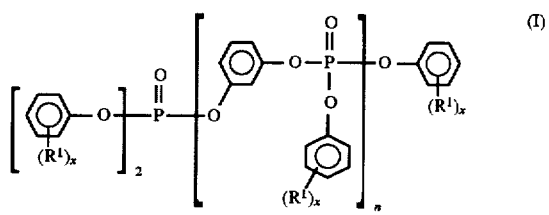

in which n is a number from 1 to 5, $R^1$ is methyl and

X is a number from 0 to 5, preferably 0 and 1 to 3;

or

E.2) a mixture of phosphorus compounds of the formula (I) and phosphorus compounds of the formula (II).

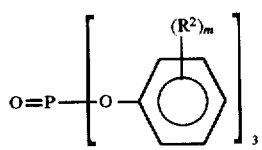

(II)

in which

R² is methyl and m is the number 0 or 1 to 5, preferably 0 and 1 to 3, wherein the quantity of phosphorus compounds of the formula (II) in the phosphate mixture prepared from E.1) and E.2) is at most 35 wt. %, preferably at most 30 wt. %.

cyclohexane or 1,1-bis-(4-hydroxyphenyl)-3,3,5-trimethyl-cyclohexane. Preferred diphenols of the formula (I) are 2,2-bis-(4-hydroxyphenyl)propane and 1,1-bis-(4-hydroxyphenyl)cyclohexane. Mixtures of diphenols may also be used, for example of bisphenol A and up to 60 mol. % of 1,1-bis-(4-hydroxyphenyl)-3,3,5-trimethylcyclohexane.

Both homopolycarbonates and copolycarbonates are suitable. Copolycarbonates A) according to the invention may also be produced using 1 to 25% by weight and preferably 2.5 to 25% by weight (based on the total quantity of diphenols used) of diphenols corresponding to formula (IIIa)

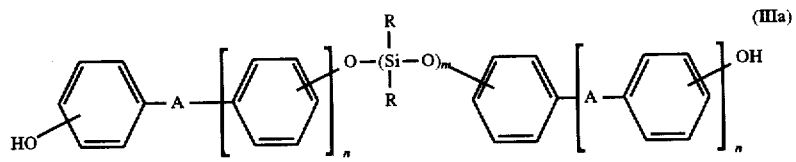

Component A)

Component A) thermoplastic polycarbonates which are suitable according to the invention may be both homo- and copolycarbonates prepared from diphenols of the formula (III),

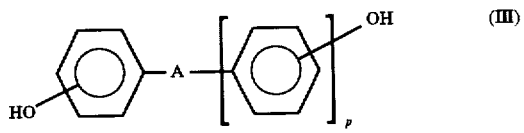

in which p is 1 or zero and

A may be a single bond, $C_1$–$C_5$ alkylene, $C_2$–$C_5$ alkylidene, $C_5$–$C_6$ cycloalkylidene optionally substituted with methyl groups, —O—, —S— and —SO₂—.

The component A) polycarbonates may be both linear and branched, they may contain aromatically-attached methyl groups and are halogen-free. The component A) polycarbonates may be used both individually and as a mixture.

The diphenols of the formula (III) are either known from the literature or may be produced using processes known from the literature. Production of component A) polycarbonates which are suitable according to the invention is likewise known from the literature and may, for example, proceed with phosgene using the phase interface process or with phosgene using the homogeneous phase process (the so-called pyridine process), wherein the molecular weight to be established is achieved in a known manner with an appropriate quantity of known chain terminators.

Suitable diphenols of the formula (III) are, for example, hydroquinone, resorcinol, 4,4'-dihydroxydiphenyl, 2,2-bis-(4-hydroxyphenyl)propane (bisphenol A), 2,4-bis-(4-hydroxyphenyl)-2-methylbutane, 2,2-bis-(4-hydroxy-3,5-dimethylphenyl)propane, 1,1-bis-(4-hydroxyphenyl)- in which

—A— is as defined for formula(III), n=1 or 0, the R's may be the same or different and represent a linear $C_{1-20}$ alkyl, branched $C_{3-20}$ alkyl or $C_{6-20}$ aryl, preferably $CH_3$, and m is an integer of 5 to 100 and preferably 20 to 80. Hydroxyaryloxy-terminated polydiorganosiloxanes corresponding to formula (IIIa) are known (cf. for example U.S. Pat. No. 3,419,634) or may be produced by methods known from the literature. The production of copolycarbonates containing polydiorganosiloxanes is described, for example, in DE-OS 3 334 782.

The polycarbonates A) may be partially or entirely replaced with aromatic polyester carbonates.

Suitable chain terminators are, for example, phenol or p-tert.-butylphenol, but also long-chain alkylphenols, such as 4-(1,3-tetramethylbutyl)phenol according to DE-OS 2 842 005 or monoalkylphenols or dialkylphenols having a total of 8 to 20 C atoms in the alkyl substituents according to German patent application 3 506 472, such as, for example, p-nonylphenol, 2,6-di-tert.-butylphenol, p-tert.-octylphenol, p-dodecylphenol, 2-(3,5-dimethylheptyl) phenol and 4-(3,5-dimethylheptyl)phenol. The quantity of chain terminators to be used is generally between 0.5 and 10 mol. % relative to the total of the diphenols (III) used in each case.

The component A) polycarbonates which are suitable according to the invention may be branched in a known manner, namely preferably by the incorporation of 0.05 to 2.0 mol. %, relative to the total of diphenols used, of trifunctional or greater than trifunctional compounds, for example such compounds having three or more than three phenolic OH groups.

The polycarbonates which are suitable according to the invention have weight average molecular weights ($\overline{M}_w$, measured for example by ultracentrifugation or light scattering) of 10,000 to 200,000, preferably of 20,000 to 80,000.

Component B.1)

Component B.1) vinyl (co)polymers which may be used according to the invention are resinous, thermoplastic and contain no rubber. They are such compounds prepared from at least one monomer selected from styrene, α-methylstyrene, ring-alkyl substituted styrene, $C_1$–$C_8$ alkyl acrylate, $C_1$–$C_8$ alkyl methacrylate (component B.1.1) with at least one monomer selected from acrylonitrile, methacrylonitrile, $C_1$–$C_8$ alkyl methacrylate, $C_1$–$C_8$ alkyl acrylate, maleic anhydride and/or N-substituted maleimide (component B.1.2).

$C_1$–$C_8$ alkyl acrylates or $C_1$–$C_8$ alkyl methacrylates are esters of acrylic acid and methacrylic acid respectively and polyhydric alcohols having 1 to 8 C atoms. Methacrylic acid methyl, ethyl and propyl esters are particularly preferred. Methacrylic acid methyl ester is cited as a particularly preferred methacrylic ester.

Thermoplastic copolymers having a composition according to component B.1) may arise as by-products of graft polymerisation during production of component C), especially if large quantities of monomers are grafted onto small quantities of rubber. The quantity of copolymer B.1) to be used according to the invention does not include these by-products of graft polymerisation.

The thermoplastic copolymers B.1) contain 50 to 95 wt. %, preferably 60 to 90 wt. % of component B.1.1) and 5 to 50 wt. %, preferably 10 to 40 wt. %, of component B.1.2).

Particularly preferred copolymers B.1) are those prepared from styrene, with acrylonitrile and optionally with methyl methacrylate, from α-methylstyrene with acrylonitrile and optionally with methyl methacrylate, or from styrene and α-methylstyrene with acrylonitrile and optionally with methyl methacrylate.

The component B.1) styrene/acrylonitrile copolymers are known and may be produced by free-radical polymerisation, in particular by emulsion, suspension, solution or bulk polymerisation. The component B.1) copolymers preferably have molecular weights $\overline{M}_w$ (weight average, determined by light scattering or sedimentation) of between 15,000 and 200,000.

Particularly preferred copolymers B.1) according to the invention are also random copolymers prepared from styrene, maleic anhydride and/or N-substituted maleimide, which may be produced from the corresponding monomers by continuous bulk or solution polymerisation with incomplete conversion.

The proportions of the two components of the random styrene/maleic anhydride copolymers which are suitable according to the invention may be varied within broad limits. The preferred content of maleic anhydride is between 5 and 25 wt. %.

The molecular weights (number average $\overline{M}_n$) of the component B.1) random styrene/maleic anhydride copolymers which are suitable according to the invention may vary within broad limits. The range from 60,000 to 200,000 is particularly preferred.

The preferred intrinsic viscosity for these products is from 0.3 to 0.9 dl/g (measured in dimethylformamide at 25° C.).

Instead of styrene, the vinyl copolymers B.1) may also contain ring-substituted styrenes such as vinyltoluenes, 2,4-dimethylstyrene and other halogen-free, substituted styrenes such as α-methylstyrene.

Component B.2)

The component B.2) polyalkylene terephthalates are reaction products prepared from aromatic dicarboxylic acids or the reactive derivatives thereof, such as dimethyl esters or anhydrides, and aliphatic, cycloaliphatic or araliphatic diols, together with mixtures of these reaction products.

Preferred polyalkylene terephthalates contain at least 80 wt. %, preferably at least 90 wt. %, relative to the dicarboxylic acid component, of terephthalic acid residues and at least 80 wt. %, preferably at least 90 mol. %, relative to the diol component, of ethylene glycol and/or 1,4-butanediol residues.

Preferred polyalkylene terephthalates may contain in addition to terephthalic acid residues up to 20 mol. %, preferably up to 10 mol. %, of residues of other aromatic or cycloaliphatic dicarboxylic acids having 8 to 14 C atoms or aliphatic dicarboxylic acids having 4 to 12 C atoms, such as for example residues of phthalic acid, isophthalic acid, naphthalene-2,6-dicarboxylicacid, 4,4'-diphenyldicarboxylic acid, succinic acid, adipic acid, sebacic acid, azelaic acid, cyclohexanediacetic acid.

The preferred polyalkylene terephthalates may contain, in addition to ethylene glycol or 1,4-butanediol residues, up to 20 mol. %, preferably up to 10 mol. % of other aliphatic diols having 3 to 12 C atoms or cycloaliphatic diols having 6 to 21 C atoms, for example residues of 1,3-propanediol, 2-ethyl-1,3-propanediol, neopentyl glycol, 1,5-pentanediol, 1,6-hexanediol, cyclohexane-1,4-dimethanol, 3-ethyl-2,4-pentanediol, 2-methyl-2,4-pentanediol,2,2,4-trimethyl-1,3-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)propane, 2,4-dihydroxy-1,1,3,3-tetramethylcyclobutane, 2,2-bis-(4-β-hydroxyethoxyphenyl)propane and 2,2-bis-(4-hydroxypropoxyphenyl)propane (DE-OS 2 407 674, 2 407 776, 2 715 932).

The polyalkylene terephthalates may be branched by incorporating relatively small quantities of tri- or tetrahydric alcohols or tri- or tetrabasic carboxylic acids, for example according to DE-OS 1 900 270 and U.S. Pat. No. 3,692,744. Examples of preferred branching agents are trimesic acid, trimellitic acid, triethylolethane and -propane and pentaerythritol.

Particularly preferred polyalkylene terephthalates are those produced solely from terephthalic acid and the reactive derivatives thereof (for example the dialkyl esters thereof) and ethylene glycol and/or 1,4-butanediol, and mixtures of these polyalkylene terephthalates.

Mixtures of polyalkylene terephthalates contain 1 to 50 wt. %, preferably 1 to 30 wt. %, of polyethylene terephthalate and 50 to 99 wt. %, preferably 70 to 99 wt. %, of polybutylene terephthalate.

The preferably used polyalkylene terephthalates generally have an intrinsic viscosity of 0.4 to 1.5 dl/g, preferably of 0.5 to 1.2 dl/g, measured in phenol/o-dichlorobenzene (1:1 parts by weight) at 25° C. in a Ubbelohde viscosimeter.

The polyalkylene terephalates may be produced using known methods (see for example Kunststoff-Handbuch, volume VIII, pages 695 et seq., Carl-Hanser Verlag, Munich 1973).

Component C)

The graft polymers C) are produced by free-radical copolymerisation of the monomer mixtures C.1) prepared from C.1.1) and C.1.2) in the presence of the rubbers to be grafted C.2) and are well known. Preferred production processes for the graft polymers C) are emulsion, solution, bulk or suspension polymerisation. Particularly preferred graft polymers C) are the so-called ABS polymers.

Examples of monomers C.1) according to C.1.1) are styrene, α-methylstyrene, p-methylstyrene, methyl methacrylate or mixtures thereof. Examples of monomers according to C.1.2) are acrylonitrile, methacrylonitrile, methyl methacrylate, n-butyl acrylate, t-butyl acrylate, maleic anhydride and N-phenylmaleimide or mixtures thereof. Preferred monomers according to C.1.1) are styrene, α-methylstyrene and methyl methacrylate. Preferred monomers according to C.1.2) are acrylonitrile, maleic anhydride and methyl methacrylate.

Particularly preferred monomers are styrene and acrylonitrile.

Suitable rubbers C2) for production of the component C) graft polymers are in particular polybutadienes, polyisoprenes, styrene/butadiene copolymer rubbers, acrylonitrile/butadiene copolymer rubbers having gel contents (measured at 20° C.) of greater than 30 wt. %, acrylate rubbers, EPDM (ethylene/propylene/diene monomer) rubbers and silicone rubbers.

Preferred rubbers C.2) are diene rubbers (for example based on butadiene, isoprene etc.) or mixtures of diene rubbers or copolymers of diene rubbers or mixtures thereof with further copolymerisable monomers, for example according to C.1.1) and C.1.2), providing that the glass transition temperature of component C.2) is below 10° C., preferably below −10° C.

Particularly preferred polymers C) are, for example, ABS polymers as are described in DE-OS 2 035 390 or in DE-OS 2 248 242.

Suitable acrylate rubbers C2) are those based on $C_1$–$C_8$ alkyl acrylates, in particular ethyl, butyl, ethylhexyl acrylate. These alkyl acrylate rubbers may optionally contain up to 30 wt. %, relative to the weight of the rubber, of copolymerised monomers such as vinyl acetate, acrylonitrile, styrene, α-methylstyrene, ring-alkylated styrene, methyl methacrylate, acrylamides and/or vinyl ethers. These alkyl acrylate rubbers may moreover also contain small quantities, preferably up to 5 wt. %, relative to the weight of the rubber, of ethylenically unsaturated monomers with a crosslinking action. Such crosslinking agents are, for example, alkylenediol di(meth) acrylates, polyester di(meth) acrylates, divinylbenzene, trivinylbenzene, triallyl cyanurate, allyl (meth)acrylate, butadiene or isoprene.

Preferred crosslinking monomers are allyl methacrylate, ethylene glycol dimethacrylate, dialylphthalate and heterocyclic compounds which have at least three ethylenically unsaturated groups. Particularly preferred crosslinking monomers in this case are triallyl cyanurate, triallyl isocyanurate, trivinyl cyanurate, triacryloyl-hexahydro-s-triazine, triallylbenzenes. The quantity of the cross-linking monomers is preferably 0.02 to 5.0 wt. %, in particular 0.05 to 2.0 wt. %, relative to the grafting backbone C2). In the case of cyclic crosslinking monomers with at least three ethylenically unsaturated groups, it is advantageous to restrict this quantity to less than 1 wt. % of the grafting backbone C2).

Acrylate rubber grafting backbones may also be products which contain a core of crosslinked diene rubber prepared from one or more conjugated dienes, such as polybutadiene, or a copolymer of a conjugated diene with an ethylenically unsaturated monomer, such as styrene and/or acrylonitrile.

Preferred rubbers for the production of the graft polymers C) are pure diene and acrylate rubbers.

Further suitable grafting backbones according to C.2) are silicone rubbers having active grafting sites as are described in DE 3 704 657, DE 3 704 655 and DE 3 621 539.

The rubbers are present in the graft polymers C) in the form of at least partially crosslinked particles of an average particle diameter of 0.1 to 3.0 μm, in particular of 0.2 to 0.6 μm. They are at least partially crosslinked, i.e. they have gel contents of greater than 20 wt. %, in particular of greater than 50 wt. %, particularly preferably in the range from 73 to 98 wt. % (measured in toluene).

Component D)

Component D) polyphenylene ethers are of the formula (IV).

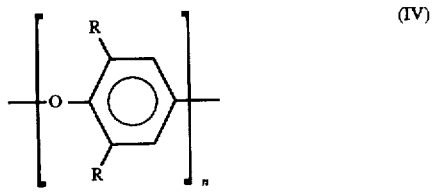

in which the ether oxygen atom of one unit is in each case attached to the aromatic ring of the adjacent unit, n is a positive integer of >20 and each R denotes hydrogen, hydrocarbon residues without a tertiary α-carbon atom and oxyhydrocarbon residues.

Polyphenylene ethers corresponding to the above formula and the production thereof by catalysed oxidative coupling from phenols and gases containing oxygen in the presence of metal amine complex catalysts are described in U.S. Pat. Nos. 3,306,874, 3,306,875, 3,257,357 and 3,257,358 and DE-OS 3 035 599 and in Houben-Weyl, Methoden der Organischen Chemie, volume E20 (1987), pages 1320 to 1388.

Suitable polyphenylene ethers are, for example, poly-(2,6-dimethyl-1,4-phenylene) ether, poly-(2,6-diethyl-1,4-phenylene) ether, poly-(2-methyl-6-ethyl-1,4-phenylene) ether, poly-(2-methyl-6-propyl-1,4-phenylene) ether, poly-(2,6-diisopropyl-1,4-phenylene) ether, poly-(2-ethyl-6-propyl-1,4-phenylene) ether or copolymers such as those containing 2,3,6-trimethyl phenol, together with mixtures of various polyphenylene ethers. Preferred compounds are poly-(2,6-dimethyl-1,4-phenylene) ether or copolymers prepared from 2,6-dimethyl phenol and 2,3,6-trimethylphenol. The polyphenylene ethers generally have an intrinsic viscosity of 0.3 to 0.7 dl/g, measured in a chloroform solution at 25° C.

Component E.1)

The polymer blends according to the invention contain phosphorus compounds of the formula (I) as flame retardants.

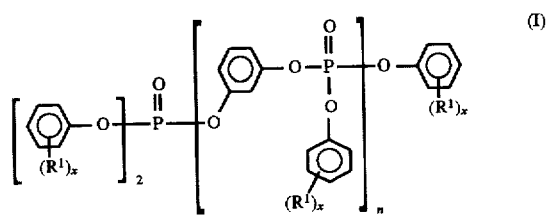

in which n, $R^1$ and l have the above-stated meaning.

Mixtures of various oligomeric phosphates may also be used as component E.1) according to the invention. In this case, n has an average value of between 1 and 5, preferably 1 and 2.

The preferably used phosphorus compound of the formula (I) is phenylene bis-(diphenyl phosphate) where n equals 1 and 2 or between 1 and 2.

Component E.2)

The blends according to the invention may moreover contain as flame retardant a mixture of phosphorus compound(s) of the formula (I) and phosphorus compound(s) of the formula (II).

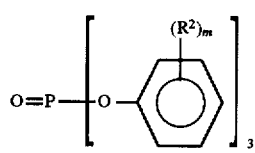

in which $R^2$ and m have the above-stated meaning.

Triphenyl phosphate is preferably used as the phosphorus compound of the formula (II).

The phosphates may generally be produced using known processes (see for example Ullmann, Enzyklopädie der Technischen Chemie, volume 18, pages 301 et seq., 1979; Houben-Weyl, Methoden der Organischen Chemie, volume 12/1, page 43; Beilstein, volume 6, page 177).

The moulding compounds according to the invention may furthermore contain customary additives such as lubricants and mould release agents, plasticisers, nucleating agents, antistatic agents, stabilisers, fillers and reinforcing materials, dyes and pigments together with the salt of a halogen-free sulphonic acid as an additional flame retardant for the polycarbonate component. Preferred reinforcing materials are glass fibre, preferred fillers glass beads, mica, quartz, talcum, wollastonite, preferred pigments carbon black and titanium dioxide. The preferred salt is the potassium salt of diphenylsulphonesulphonic acid.

The thermoplastic moulding compounds according to the invention containing components A) to E) are produced by mixing the individual constituents in a known manner and melt-compounding then at temperatures of 200° to 280° C. In customary equipment such as internal kneaders, extruders or double screw extruders.

The individual constituents may be mixed in a known manner both successively and simultaneously, and in fact at elevated temperature.

The particular components may be used both individually and as a mixture, for example two or more polycarbonates or copolymers etc..

The present invention thus also provides a process for the production of thermoplastic polycarbonate moulding compounds consisting of components A) to E), which is characterised in that the particular above-stated constituents are mixed in a known manner and then melt-compounded or melt-extruded at temperatures of 200° C. to 300° C., preferably to 280° C. in customary equipment.

The moulding compounds of the present invention may be used for the production of mouldings of any kind. Mouldings may in particular be produced by injection moulding. Examples of mouldings which may be produced are: casing components of all kinds (for example for domestic appliances and office equipment) or covers for the construction sector and components for the automotive sector. They are also used in the electrical engineering sector because they have very good electrical properties.

The moulding compounds are particularly suitable for the production of thin-walled mouldings (for example data processing equipment casing components), where particularly severe requirements are placed upon the plastics used with regard to notched impact strength, stress cracking behaviour and dimensional stability.

Particle size always means average particle diameter $d_{50}$, determined by ultracentrifuge measurements in accordance with W. Scholtan et al., Kolloid-Z. & Z. Polymere 250 (1972), 782 to 796.

EXAMPLES

Materials used

Component A) (PC 1)

Bisphenol A based polycarbonate with a relative solution viscosity of 1.34, measured in methylene chloride at 25° C. and a concentration of 0.5 g/100 ml.

Component A) (PC 2)

Bisphenol A based polycarbonate with a relative solution viscosity of 1.29, measured in methylene chloride at 25° C. and a concentration of 0.5 g/100 ml.

Component B) (SAN)

Styrene/acrylonitrile copolymer with a styrene/acrylonitrile ratio of 72:28 and an intrinsic viscosity of 55 dl/g (measured in dimethylformamide at 20° C.).

Component C) (ABS)

Graft polymer of 45 wt. % styrene/acrylonitrile in a 72:28 ratio on 55 wt. % of particulate crosslinked polybutadiene rubber (average particle diameter $d_{50}=0.4$ μm) produced by emulsion polymerisation.

Component D) (PPO)

Polyphenylene oxide produced from 2,6-dimethylphenol according to DE-OS 3 035 599 (example), with an intrinsic viscosity of 0.42 dl/g measured in chloroform at 25° C.

Component E.1) (RDP)

m-Phenylene-bis-(diphenyl phosphate) (Fyroflex RDP, from Akzo B.V.).

Component E.2) (RDP+TPP)

Mixture of 75.0 wt. % of m-phenylene-bis-(diphenyl phosphate) (see above) and 25.0 wt. % of triphenyl phosphate (Disflamoll TP, from Bayer AG).

Further phosphate component (TPP)

Triphenyl phosphate (Disflamoll TP, Bayer AG).

Further phosphate component (TIPP)

Triisopropylphenyl phosphate (Reofos 95, from Ciba-Geigy Industrial Chemicals).

Production and testing of moulding compounds

The flame-resistant thermoplastic moulding compounds were produced by kneading in a model W 50 E small-scale kneader from the company Brabender OHG, Duisburg within the temperature range from 210° to 230° C., at a rotational speed of 60 min$^{-1}$ and a kneading time of 10 minutes. The resultant moulding compound was compression moulded into 2.1 or 1.6 mm sheets using an electrically heated Polystat 200 T laboratory compression moulding machine from the company Schwabenthan, the compression temperature was 200° C., the pressure 200 bar and duration 5 minutes.

TABLE 1

| | Components used (quantities in wt. %) | | | | | | | | |
|---|---|---|---|---|---|---|---|---|---|
| Component | A) PC 1 | A) PC 2 | B) SAN | C) ABS | D) PPO | E.1) RDP | E.2) RDP + TPP | TPP | TIPP |
| Comparison 1 | 70.0 | | 5.0 | 10.0 | | 15.0 | | | |
| Comparison 2 | | 70.0 | 5.0 | 10.0 | | 15.0 | | | |
| Comparison 3 | 68.0 | | 5.0 | 10.0 | 2.0 | 15.0 | | | |

TABLE 1-continued

| Component | Components used (quantities in wt. %) | | | | | | | | |
|---|---|---|---|---|---|---|---|---|---|
| | A) PC 1 | A) PC 2 | B) SAN | C) ABS | D) PPO | E.1) RDP | E.2) RDP + TPP | TPP | TIPP |
| Comparison 4 | 60.0 | | 5.0 | 10.0 | 10.0 | 15.0 | | | |
| Comparison 5 | | 60.0 | 5.0 | 10.0 | 10.0 | 15.0 | | | |
| Comparison 6 | 65.0 | | 5.0 | 10.0 | 5.0 | | | 15.0 | |
| Comparison 7 | 65.0 | | 5.0 | 10.0 | 5.0 | | | | 15.0 |
| Comparison 8 | 69.7 + 0.3% PTFE | | 5.0 | 10.0 | | 15.0 | | | |
| Example 1 | 67.0 | | 5.0 | 10.0 | 3.0 | 15.0 | | | |
| Example 2 | 66.0 | | 5.0 | 10.0 | 4.0 | 15.0 | | | |
| Example 3 | 65.0 | | 5.0 | 10.0 | 5.0 | 15.0 | | | |
| Example 4 | | 65.0 | 5.0 | 10.0 | 5.0 | 15.0 | | | |
| Example 5 | 68.0 | | 5.0 | 10.0 | 5.0 | 12.0 | | | |
| Example 6 | 65.0 | | 5.0 | 10.0 | 5.0 | | 15.0 | | |
| Example 7 | | 65.0 | 5.0 | 10.0 | 5.0 | | 15.0 | | |
| Example 8 | Composition as example 3 | | | | | | | | |
| Example 9 | Composition as example 4 | | | | | | | | |
| Example 10 | Composition as example 6 | | | | | | | | |
| Example 11 | Composition as example 7 | | | | | | | | |

The necessary test sheets were sawn from the sheets and subjected to the following tests:

impact strength to DIN 53 543 ($a_n$).
heat deformation temperature to DIN 53 460 (Vicat B).
oxygen index (LOI value to ASTM D-2863-77.
flammability test using Underwriters' Laboratories method (UL-94).
stress cracking behaviour.

Stress cracking behaviour was investigated on bars of dimensions 80×10×4 mm, compression temperature 220° C. The test medium used was a mixture of 60 vol. % toluene and 40 vol. % isopropanol. The test pieces were pre-stressed on a circular arc template (elongation in percent) and stored in the test medium at room temperature. Stress cracking behaviour was determined by assessing cracking or failure as a function of length of exposure to the test medium.

The test data obtained are shown in table 2.

TABLE 2

| | Test data | | | | | Stress cracking behaviour | |
|---|---|---|---|---|---|---|---|
| | | | | UL-94 rating | | | |
| | Test data $a_n$ | Vicat B °C. | LOI index % $O_2$ | Thickness of test specimen | Burn time seconds | Prestressing % | Time to failure minutes |
| Comparison 1 | 46/nf* | 87 | 28.5 | V-2/2.1 mm | 60 | | |
| Comparison 2 | 45/nf | 87 | | V-2/2.1 mm | 74 | | |
| Comparison 3 | 54/nf | 89 | 30.0 | V-2/2.1 mm | 41 | | |
| Comparison 4 | 25/f** | 101 | | V-0/2.1 mm | 10 | | |
| Comparison 5 | 17/f | 101 | | V-0/2.1 mm | 10 | | |
| Comparison 6 | 40/nf | 80 | 27.5 | V-0/2.1 mm | 30 | | |
| Comparison 7 | 55/nf | 95 | 27.5 | V-2/2.1 mm | 61 | | |
| Comparison 8 | 55/nf | 92 | | V-0/2.1 mm | 10 | | |
| Example 1 | 54/nf | 88 | 30.5 | V-0/2.1 mm | 13 | | |
| Example 2 | 56/nf | 89 | | V-0/2.1 mm | 14 | | |
| Example 3 | 49/nf | 89 | 32.5 | V-0/2.1 mm | 12 | 1.2 | 17.0 |
| Example 4 | 47/nf | 89 | | V-0/2.1 mm | 15 | 0.6 | 0.5 |
| Example 5 | 56/nf | 98 | 33.5 | V-0/2.1 mm | 11 | | |
| Example 6 | 49/nf | 86 | 33.5 | V-0/2.1 mm | 22 | 1.2 | 22.0 |
| Example 7 | 47/nf | 86 | | V-0/2.1 mm | 23 | 0.6 | 3.5 |
| Example 8 | 27/nf | 89 | 32.5 | V-0/1.6 mm | 33 | | |
| Example 9 | 27/nf | 89 | | V-0/1.6 mm | 37 | | |
| Example 10 | 28/nf | 86 | 33.5 | V-0/1.6 mm | 11 | | |
| Example 11 | 27/nf | 86 | | V-0/1.6 mm | 29 | | |

*nf = no failure
**f = failure

As may be seen from tables 1 and 2, the moulding compounds according to the invention (examples 1 to 11) have:

a non-dripping rating of V-0 with 2.1 mm (examples 1 to 5) and even with 1.6 mm thick mm test specimens (examples 8 and 9) with a content of 3 to 5 wt. % of polyphenylene oxide and 12 to 15 wt. % of m-phenylene-bis-(diphenyl phosphate).

a non-dripping rating of V-0 at 2.1 and 1.6 mm (examples 6 and 7 and 10 and 11) with a content of 3 to 5 wt. % of polyphenylene oxide and 15 wt. % of a mixture of m-phenylene-bis-(diphenyl phosphate) and triphenyl phosphate (75 and 25 wt. %), improved stress cracking resistance (examples 6 and 7 in comparison with 3 and 4) with the above quantity of polyphenylene oxide and phosphate mixture, customary, high impact strength and heat resistance values.

If the polyphenylene oxide component is missing, the specimens have a rating of only V-2 (comparative examples 1 and 2), if they have a content of 2.0%, the rating is again only V-2 (comparison 3), if the content is 10% while the flammability rating is indeed V-0, the material is embrittled (comparative examples 4 and 5).

If only triphenyl phosphate is used together with polyphenylene oxide, the specimen has a rating of V-0, but the softening temperature is reduced to 80° C. (comparative example 6).

If other phosphates are used, this rating is not achieved, if tri-isopropylphenyl phosphate is used, a rating of only V-2 is obtained (comparative example 7).

Example 5 and comparative example 8 show that small quantities of polyphenylene oxide with customary quantities of m-phenylene-bis-(diphenyl phosphate), and also when mixed with triphenyl phosphate (example 6 and 7), may equally well impart the antidripping properties of polytetrafluoroethylene, combined with the major advantage of containing no halogen.

We claim:

1. Thermoplastic halogen-free moulding compounds consisting of

A) 50 to 95 wt. % of thermoplastic aromatic polycarbonate,

B) 0 to 20wt. % of copolymer or polycondensation product prepared form

B.1) thermoplastic copolymer prepared form

B.1.1) 50 to 95 wt. % of styrone, a-methylstyrene, ring-alkylated styrone, $C_1$-$C_8$ alkyl acrylate, $C_1$-$C_8$ alkyl methacrylate or mixtures thereof and B.1.2) 5 to 50 wt. % of acrylonitrile, methacrylonitrile, $C_1$-$C_8$ alkyl acrylate, $C_1$-$C_8$ alkyl methacrylate, maleic anhydride, N-substituted maleimide, vinyl acetate or mixtures thereof and/or B.2) thermoplastic polyalkylene terephthalate, C) 3 to 18 wt. % of graft polymer produced from C.1) 5 to 90 wt. % of a mixture prepared from C.1.1) 50 to 95 wt. % of styrene, a-methylstyrene, ring-alkylated styrene, methyl methacrylate or mixtures thereof and C.1.2) 5 to 50 wt. % of acrylonitrile, methacrylonitrile, $C_1$-$C_8$ alkyl acrylate, $C_1$-$C_8$ alkyl methacrylate, maleic anhydride, N-substituted maleimide or mixtures thereof on C.2) 10 to 95 wt. % of rubber with a glass transition temperature $T_g$ of $\leq 10°$, D) 3 to 6 wt. % of thermoplastic polyphenylene ether, E) 3 to 18 wt. % of phosphoric acid ester prepared form E.1) phosphorus compounds of the formula (I),

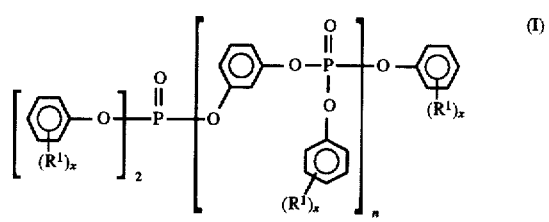

in which n is a number from 1 to 6

$R^1$ is methyl and

X is a number 0 from to 5;

E.2) a mixture of phosphorus compounds of the formula (I) and phosphorus compounds of the formula (II),

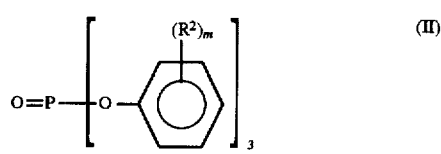

in which $R_2$ is methyl and m is a number from 1 to 5, where the quantity of phosphorus compounds of formula (II) in the phosphate mixture prepared from E.1) and E.2) is at most 35 wt. %, wherein all percentages by weight are based on weight of molding compounds.

2. Thermoplastic halogen-free moulding compounds consisting of

A) 50 to 95 wt. % of thermoplastic aromatic polycarbonate,

B) 0 to 20 wt. % of copolymer or polycondensation product prepared form

B.1) thermoplastic copolymer prepared form

B.1.1) 50 to 95 wt. % of styrene, a-methylstyrene, ring-alkylated styrene, $C_1$-$C_8$ alkyl acrylate, $C_1$-$C_8$ alkyl methacrylate or mixtures thereof and B.1.2) 5 to 50 wt. % of acrylonitrile, methacrylonitrile, $C_1$-$C_8$ alkyl acrylate, $C_1$-$C_8$ alkyl methacrylate, maleic anhydride, N-substituted maleimide, vinyl acetate or mixtures thereof and/or B.2) thermoplastic polyalkylene terephthalate, C) 3 to 18 wt. % of graft polymer produced from C.1) 5 to 90 wt. % of a mixture prepared from C.1.1) 50 to 95 wt. % of styrene, a-methylstyrene, ring-alkylated styrene, methyl methacrylate or mixtures thereof and C.1.2) 5 to 50 wt. % of acrylonitrile, methacrylonitrile, $C_1$-$C_8$ alkyl acrylate, $C_1$-$C_8$ alkyl methacrylate, maleic anhydride, N-substituted maleimide or mixtures thereof on C.2) 10 to 95 wt. % of rubber with a glass transition temperature $T_g$ of $\leq 10°$, D) 3 to 6 wt. % of thermoplastic polyphenylene ether, E) 3 to 18 wt. % of phosphoric acid ester prepared form E.1) phosphorus compounds of the formula (I),

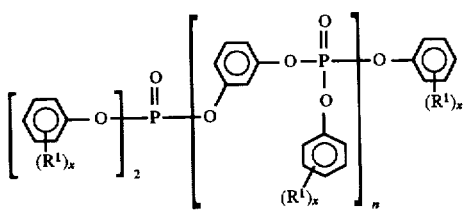
(I)

in which n is a number from 1 to 6
$R^1$ is methyl and
X is a number from 0 to 5;

E.2) a mixture of phosphorus compounds of the formula (I) and phosphorus compounds of the formula (II),

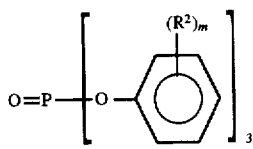
(II)

in which $R_2$ is methyl and
m is a number from 1 to 5, where the quantity of phosphorus compounds of formula (II) in the phosphate mixture prepared from E.1) and E.2) is at most 35 wt. %, wherein all percentages by weight are based on weight of molding compound, F) one or more additives selected from lubricants and mould release agents, plasticisers, nucleating agents, stabilisers, antistatic agents, fillers and reinforcing materials, dyes and/or pigments together with the salt of a halogen-free sulphonic acid.

3. Thermoplastic moulding compounds according to claim 1, containing

A) in a quantity of 60 to 90 wt. %,
B) in a quantity of 1 to 15 wt. %,
C) in a quantity of 5 to 15 wt. %,
D) in a quantity of 3 to 6 wt. % and
E) in a quantity of 5 to 15 wt. %.

4. Thermoplastic moulding compounds according to claim 1, wherein component E) is m-phenylene-bis-(diphenylphosphate) or a mixture of m-phenylene-bis-(diphenylphosphate) and triphenyl phosphate.

5. A process for producing the thermoplastic molding compounds as claimed in claim 1, wherein components A)–E) are mixed and melt-compounded or melt-extruded at temperatures of 200°–300°.

6. A molding produced from the molding compound as claimed in claim 1.

* * * * *